FM STEREO RECEIVER CIRCUIT USING AN AVERAGING DETECTION MEANS

Filed April 1, 1963 2 Sheets-Sheet 1

INVENTOR:
JENS BANG,
BY Donald R. Timbie
HIS ATTORNEY.

June 28, 1966 J. BANG 3,258,540

FM STEREO RECEIVER CIRCUIT USING AN AVERAGING DETECTION MEANS

Filed April 1, 1963 2 Sheets-Sheet 2

INVENTOR:
JENS BANG,
BY Donald R. Timbie
HIS ATTORNEY.

3,258,540

FM STEREO RECEIVER CIRCUIT USING AN AVERAGING DETECTION MEANS

Jens Bang, Decatur, Ill., assignor to General Electric Company, a corporation of New York Filed Apr. 1, 1963, Ser. No. 269,374
2 Claims. (Cl. 179—15)

Figures 1, 2, 3, 4, 5, 6:
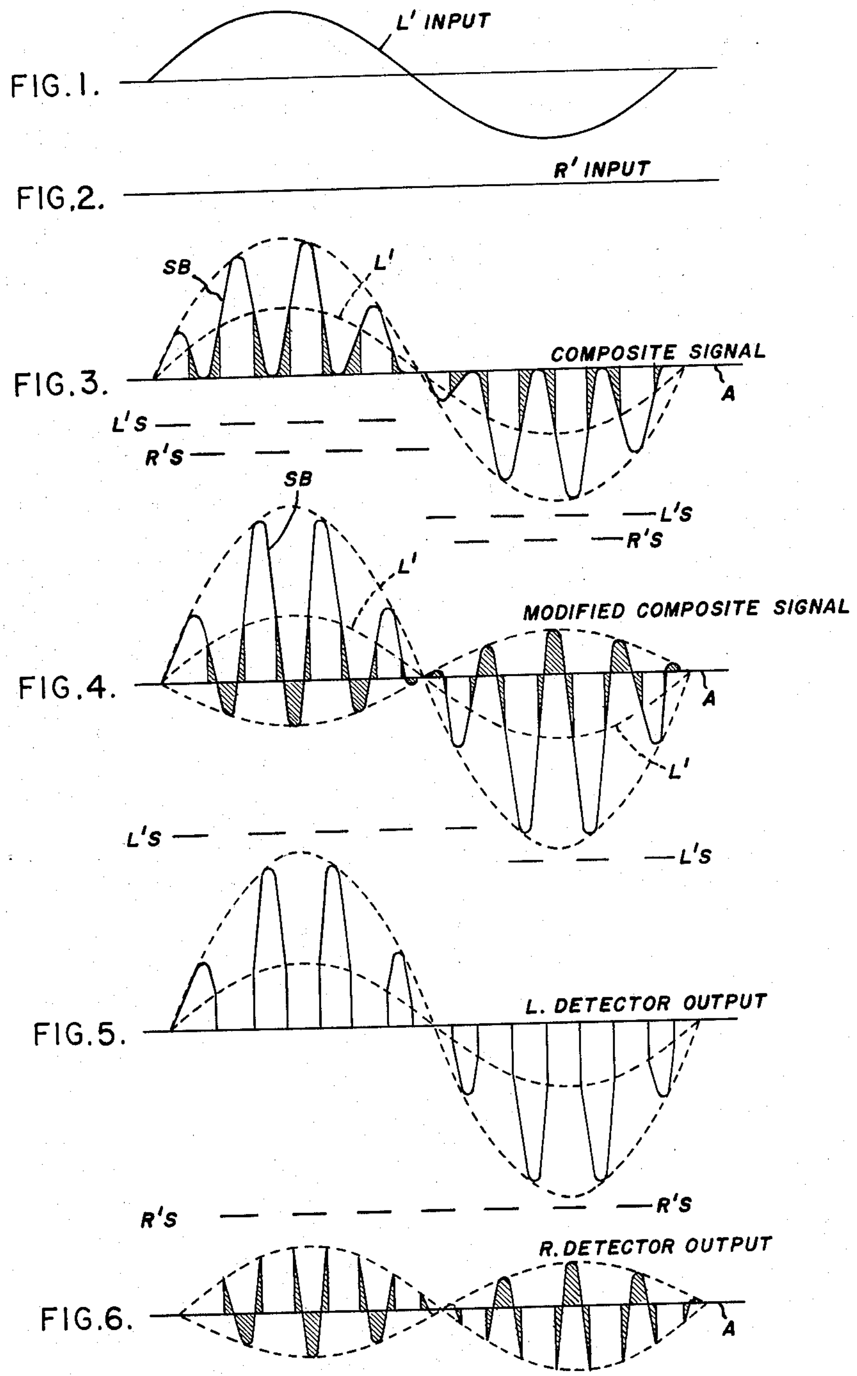

This invention relates to improvements in circuits used to derive separate stereophonic signals from the type of signal information conveyed in accordance with the present Federal Communications Commission standards for frequency modulation stereophonic transmission.

In this system completely separate audio signals L and R, representing respectively the audio signals generated by left and right hand microphones, are transmitted by modulating the frequency of the carrier in accordance with the amplitude variations of a modulation signal comprised of the sum of the audio signals i.e. $L^1+R^1$ and the products resulting from amplitude modulation of a 38 kilocycle carrier with the difference between the audio signals i.e. $L^1-R^1$. The primes indicate that the individual audio signals are in what is known as their pre-emphasized form, which means that in accordance with the usual frequency modulation transmission, the amplitudes of the signals L and R are respectively increased for the higher audio frequencies. The 38 kilocycle carrier is suppressed so that it does not accompany the products of amplitude modulation directly. Instead a 19 kilocycle wave is transmitted which is used at receivers to recreate the 38 kilocycle wave.

In order to derive the separate L and R audio signals from the composite signal first described, it has heretofore been proposed that, in accordance with well known theory, that one of these signals be derived by sampling the composite signal at times corresponding to the positive crests of the 38 kilocycle suppressed carrier and that the other be derived by sampling the negative crests of the 38 kilocycle carrier wave. The peaks of the samples taken during the positive crests correspond to the frequency pre-emphasized signal $L^1$ and the peaks of the samples taken during the negative crests correspond to the frequency pre-emphasized signal $R^1$. Each of the signals $L^1$ and $R^1$ are then frequency de-emphasized so as to yield the original audio signals L and R at separate outputs. Peak detectors may be used to perform this sampling function.

However, such a system has the defect of forming both even and odd harmonics of the carrier or sampling frequency which beat with noise or other signal components to produce frequencies which are detected to form interfering audio components.

On the other hand if averaging detectors are used i.e. detectors which produce an output corresponding to the average of the composite signal occurring during the positive or negative half cycle of the carrier wave, cross talk occurs between the left and right channels.

Accordingly, it has been suggested that the cross talk be eliminated by providing additional circuits for subtracting a reduced amplitude of the sum of the audio signals $L+R$ from each output signal. Then, if the signal at the left channel output is $L+r$, when $r$ represents the undesired cross talk from the right channel, and if the signal at the right channel output is $R+l$, where $l$ represents the undesired output from the left channel, it can be seen that the cross talk can be eliminated if a signal of amplitude $l+r$ is subtraced from each channel. This will yield signals $L-l$ and $R-r$, which, although free from cross talk still have amplitudes reduced respectively by $l$ and $r$. Additional circuitry and accordingly, additional expense are required to perform the necessary functions. However, it will be seen that any amplifier prior to the detector will have to handle in an acceptable manner the useful signal $L+R$ as well as an additional signal $l+r$. Thus the amplifier must have a greater signal handling capability and therefore be more expensive.

It is, therefore an object of this invention to provide a circuit for separating the signals L and R that is less expensive.

It is another object of this invention to provide an improved circuit for separating the L and R signals with a maximum amplitude.

Briefly, these objects as well as other advantages can be achieved in accordance with the principles of this invention by providing means for increasing the ratio of the amplitude modulation sidebands of the suppressed 38 kilocycle carrier wave to the amplitude of the $L+R$ audio signal as compared to the ratio existing in the signals as transmitted. This can be effected by increasing the gain of the receiver for the $L^1-R^1$ sidebands with respect to the gain for $L^1+R^1$ signal, by decreasing the gain of the receiver for the $L^1+R^1$ signal with respect to the $L^1-R^1$ sidebands or by a combination of both methods.

Figure 11:
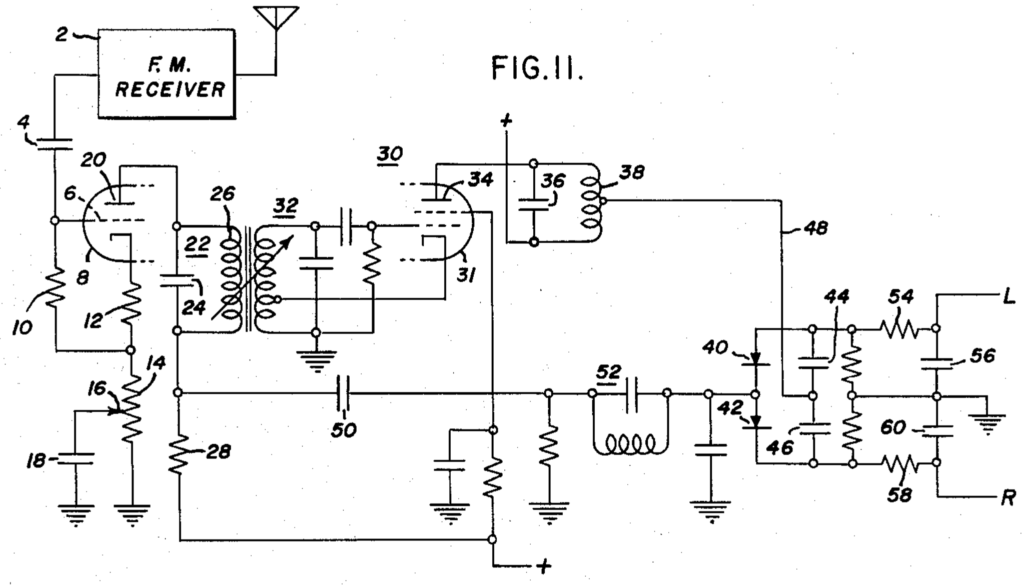

The manner in which the objects are attained in accordance with this invention will be more fully explained in connection with the drawings in which:

FIGURES 1–10 are waveforms used to aid in explaining the operation of the invention, and FIGURE 11 illustrates in schematic form an embodiment of the present invention.

In order to simplify the explanation of this invention the waveforms of FIGURES 1–10 are drawn with the assumption that the signal $L^1$ in the left channel is a sinusoidal wave as indicated in FIGURE 1 and that the signal $R^1$ in the right channel is zero. Under these conditions the composite signal would be the summation of $L^1$ and the upper and lower sidebands of the suppressed carrier of 38 kilocycles; such a combination being illustrated in FIGURE 3. In this figure, the solid line SB represents the summation of the sidebands of the 38 kilocycle wave, and the audio signal $L^1$, and if the audio wave $L^1$ were not present the wave SB would be symmetrically disposed about a straight line horizontal axis. When such a signal is added to the audio signal $L^1$, represented by the dotted line, the result is as shown in FIGURE 3. The amplitude of the sidebands resulting from amplitude modulation of the 38 kilocycle carrier varies as the amplitude of the modulating signal $L^1$, and the summation of the sidebands varies in the same way. Hence the amplitude of the wave SB is a maximum when $L^1$ is a maximum, etc. In the present system, the relationship between the amplitude of an audio signal $L^1$ and the sidebands SB produced by the signal $L^1$ is such that the peaks of the signal SB just touch the horizontal straight line axis A. During the left hand audio half cycle of $L^1$, the negative peaks of the wave SB touch the axis A and during the right hand audio half cycle the positive peaks of the wave SB touch the axis.

Figure 7:
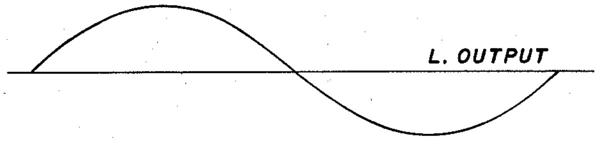

Now if the composite wave of FIGURE 3 is sampled during one set of alternate half cycles of the wave SB, as indicated by the dashes $L^1S$, the average value of these samples will yield an output signal $L^1$, shown in FIGURE 7 which is the same as the input signal $L^1$ of FIGURE 1, it being assumed that the sampling system has unity gain.

Figure 9:
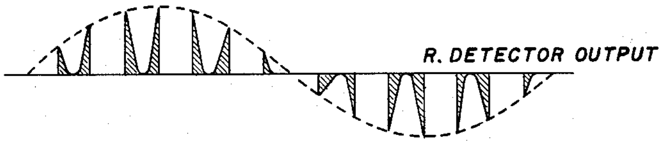
Figure 10:
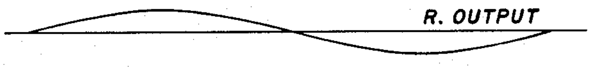

However, if the composite signal of FIGURE 3 is sampled during the other set of alternate half cycles, as indicated by the dashes $R^1S$, the samples will be as indicated in the shaded portions of FIGURES 3 and 9. The average value of these samples, which appears at the output for the right hand channel will be as indicated in FIGURE 10. Now it has been assumed that the input to the right hand channel was zero, as indicated in FIGURE 2, and consequently FIGURE 10 represents undesired cross talk between the left input channel and the right output channel. In a similar way it could be shown that cross talk would exist between the right input channel and the left output channel.

In accordance with this invention the composite signal as illustrated in FIGURE 3, which is in the form normally received is altered by increasing the relative magnitude of the sideband components SB with respect to the audio component, shown as $L^1$ in this particular example. The composite signal, modified in accordance with this invention, is shown in FIGURE 4. It will be noted that the relative increase in the amplitude of the summation of the sideband components SB is such that the negative peaks in the left hand audio half cycle of the audio wave $L^1$ and the positive peaks of the wave SB during the right half cycle of the audio wave $L^1$ extend across the axis A.

Sampling of the modified composite wave of FIGURE 4 during the intervals indicated by the dashes $L^1S$ yields pulses such as shown in FIGURE 5 which have an average value corresponding to $L^1$, the same as the input $L^1$ to the left channel.

Figure 8:

Sampling of modified composite wave during intervals $R^1S$ that are interleaved with the intervals $L^1S$ produces samples indicated by the shaded areas in FIGURES 4 and 6. Examination of these shaded areas shows that there are equal amounts of shaded area above and below the axis A, and this causes the signal in the output of the right channel to be zero as shown in FIGURE 8. As a result it can be seen that there is no cross talk between the input of the left channel and the output of the right channel.

Reference is now made to FIGURE 11 which is a schematic representation of one form of this invention. A frequency modulation receiver 2 of any suitable design supplies at its output a composite signal comprised of the sum of the audio signals $L^1$ and $R^1$, the sidebands resulting from the modulation of a 38 kiliocycle wave with the difference $L^1-R^1$ of the audio signals and a 19 kilocycle pilot carrier that lies within the gap between the highest frequency in the sum $L^1+R^1$, i.e. 15,000 cycles and the lowest frequency sideband which is 23 kilocycles. The output of the receiver 2 is coupled via a capacitor 4 to a grid 6 of an amplifier 8. The grid leak resistor 10 is connected between the grid 6 and the nearer ground end of a cathode biasing resistor 12. In accordance with this invention a potentiometer 14 is connected between the junction of the resistors 10 and 12 and a point of reference potential herein shown as ground. The moveable tap 16 of the potentiometer 14 is connected to ground via a capacitor 18. In this particular embodiment of the invention the potentiometer 14 and capacitor 18 constitute means for increasing the amplitude of the sideband components SB relative to the audio components $L^1+R^1$. The action of this circuit is as follows. That portion of the potentiometer resistance above the tap 16 serves the very desirable function of linearizing the output of the amplifier 8. The value of capacitance for the capacitor 18 is such as to present a lower impedance for the sideband components than the resistance between the tap 16 and ground and a higher value of impedance than this resistance for the audio components. At some intermediate point such as 19 kilocycles the impedance of the capacitor may be equal to the resistance of the portion of the resistor between the tap 16 and ground. This means that the audio signals $L^1+R^1$ are degenerated by the resistance between the tap 16 and ground to a greater degree than the sideband components, and, as is well known to those skilled in the art, the greater the degeneration the less the amplitude of the signal at the output of the amplifier 8.

The anode 20 of the amplifier 8 is connected to a point of positive operating potential via a parallel circuit 22, comprised of a capacitor 24 and a variable inductor 26, and an anode load resistor 28. The variable inductor 26 is adjusted so as to produce resonance of the circuit 22 at the frequency of the pilot carrier which is 19 kilocycles in the presently standardized system. Hence most of the voltage of the pilot signal appears across the circuit 22 and the remainder of the composite signal, i.e. the audio components $L^1+R^1$ and the sideband components SB, appear across the load resistor 28.

In this particular embodiment of the invention, the 19 kilocycle pilot signal is doubled in frequency by an oscillator 30 having an amplifier 31. The grid tank circuit 32 is tuned to 19 kilocycles and is magnetically coupled to tthe resonant circuit 22, and an output electrode 34 of the amplifier 31 is connected to a source of positive operating potential via a parallel resonant circuit 36, 38 that is tuned to 38 kilocycles. Other means for doubling the frequency of the pilot signal, such as frequency doublers may be used.

Derivation of the audio signals $L^1$ and $R^1$ may be effected by any suitable means, but in this particular embodiment the means is comprised of like poled diodes 40 and 42 connected in series parallel relationship with serially connected capacitors 44 and 46. Serially connected resistors 45 and 47 are connected in series parallel relation to the series capacitors 44, 46, and the junction between the resistors 45, 47 is connected to ground. The 38 kilocycle wave is applied to the junction of the capacitors 44 and 46 via a lead 48 from the resonant circuit 36, 38. The signals $L^1+R^1$ and the sidebands SB produced by amplitude modulation of the 38 kilocycle carrier with the $L^1-R^1$ signal combination are coupled via a capacitor 50 and a filter 52, that is tuned so as to reject the 67 kilocycle storecasting signals sometimes transmitted with the stereophonic signal, to the junction of the diodes 40, 42. The amount of current flowing through the diode 40 depends on the sum of the $L^1+R^1$ audio signal and the $L^1-R^1$ sidebands. Because the latter sum is $L^1-R^1$, the net result is that the average of the current conducted corresponds to the signal $2L^1$. A voltage corresponding to $2L^1$ appears at the ungrounded end of the resistor 45 owing to the fact that the time constant of the capacitor 44, resistor 45 and a resistor 51 connected so as to provide a direct current return path is sufficiently short. If this time constant were long enough, the diode 40 and its associated circuitry just described would act as a peak detector. A frequency de-emphasis circuit comprised of a resistor 54 and a capacitor 56 compensates for the increased amplitude of the higher audio frequencies at the transmitter, and the signal 2L appears across the capacitor 56.

The diode 42 conducts during the negative half cycles of the 38 kilocycle wave, i.e., during the intervals $R^1S$ noted in previously, and the current flowing is determined by the difference between the $L^1+R^1$ audio signal and the $L^1-R^1$ sidebands so as to produce a signal $2R^1$ at the undergrounded end of the resistor 47. The reason why the conduction is proportional to the difference rather than the sum can be noted by examination of FIGURE 4, wherein it is seen that during the intervals $R^1S$ the wave SB is negative or below the signal $L^1$. Of course the condition depicted in FIGURE 4 was for R equal to zero. A frequency de-emphasis network comprised of a resistor 58 and a capacitor 60 recovers the signal 2R.

It will be appreciated that the diodes 40, 42 and the circuits operatively associated therewith are only one means responsive to the reconstituted carrier wave and the modified composite signal for producing one of said audio signals L, for example, at one output and R at the other. In some circuit arrangements, it may not be so apparent that the suppressed carrier has been reconstituted but in general all will be responsive to the pilot signal in one way or another. Consequently, the oscillator 30, or other means for doubling the frequency of the pilot signal, along with the diodes 40, 42 constitute one of many means for deriving the separate audio signals from the pilot signal and the modified composite signal. However, this invention is only applicable where average detectors are used or where the detector produces cross talk.

Whereas the invention has been described in conjunction with a circuit adapted to operate in response to a type of composite signal, in which the suppressed carrier is reconstituted from a pilot signal, it will be apparent that it is applicable to a system in which the information as to the carrier is conveyed in another way, or even if the carrier is not suppressed.

I hereby claim:

1. Apparatus for separating two audio signals from a composite signal containing their sum, sideband components resulting from amplitude modulation of a carrier with the difference between the two signals, the carrier being suppressed, and a pilot signal, the peak-to-peak amplitude of the sum of said signals being equal to the peak-to-peak amplitude of said sideband components, comprising in combination means for reconstituting said carrier in response to said pilot signal, means including a potentiometer and a capacitor for modifying said composite signal so as to increase the amplitude of said sideband components with respect to the amplitude of the sum of said audio signals, said potentiometer connected in a circuit between a first point and a second point of reference potential, a variable tap on said potentiometer, said capacitor connected between said tap and said second point, and averaging detector means responsive to the pilot signal and said modified composite signal for directly producing one of said audio signals at one output and the other audio signal at another output, without the need of any matrixing after detection.

2. An adaptor for deriving separated signals from a composite signal comprised of the sum of the audio signals, the sidebands resulting from the amplitude modulation of a carrier wave with the difference between the audio signals and a pilot signal comprising in combination an amplifier having an anode, a cathode and a grid, means adapted to couple the composite signal to said grid, a potentiometer and a capacitor for modifying said composite signal, said potentiometer connected in a circuit between said cathode and ground, a variable tap on said potentiometer, said capacitor connected between said tap and ground, a parallel resonant circuit and a load resistor connected in series between said anode and a point of positive operating potential, said parallel resonant circuit being tuned to the frequency of said pilot signal, carrier deriving means coupled to said parallel resonant circuit for deriving a wave having the frequency of said carrier wave from the pilot signal, a first averaging detector, a second averaging detector, means for coupling said carrier from said carrier deriving means to said first and second detectors, said first detector being poled so as to conduct during positive half cycles of said carrier wave, said second detector being poled so as to conduct during negative half cycles of said carrier wave, and means for coupling the composite signal appearing across said load resistor to said poled detectors.

References Cited by the Examiner

UNITED STATES PATENTS

| | | | |
|---|---|---|---|
| 3,070,662 | 12/1962 | Eilers | 179—15 |
| 3,124,653 | 3/1964 | Schroeder | 179—15 |
| 3,133,993 | 5/1964 | De Vries | 179—15 |

OTHER REFERENCES

De Vries: IRE Transactions on Broadcast and Television Receivers, July 1961, pages 67–72.

Von Recklinghausen: IRE Transactions on Broadcast and Television Receivers, November 1961, pages 65–71.

Crowhurst: Radio-Electronics, February 1962, pages 49–51.

DAVID G. REDINBAUGH, *Primary Examiner.*

STEPHEN W. CAPELLI, *Examiner.*

R. L. GRIFFIN, *Assistant Examiner.*